(12) United States Patent
Jaentsch et al.

(10) Patent No.: US 10,723,564 B2
(45) Date of Patent: Jul. 28, 2020

(54) METHOD FOR MOVING A ROTOR, LINEAR DRIVE, AND PRODUCTION OR PACKAGING MACHINE

(71) Applicant: Siemens Aktiengesellschaft, Munich (DE)

(72) Inventors: Michael Jaentsch, Princeton, NJ (US); Carsten Spindler, Remptendorf (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 15/778,178

(22) PCT Filed: Nov. 15, 2016

(86) PCT No.: PCT/EP2016/077738
§ 371 (c)(1),
(2) Date: May 22, 2018

(87) PCT Pub. No.: WO2017/089182
PCT Pub. Date: Jun. 1, 2017

(65) Prior Publication Data
US 2018/0370736 A1 Dec. 27, 2018

(30) Foreign Application Priority Data

Nov. 24, 2015 (EP) .................................... 15196041
Nov. 24, 2015 (EP) .................................... 15196047
(Continued)

(51) Int. Cl.
*B65G 37/00* (2006.01)
*B65G 54/02* (2006.01)
(Continued)

(52) U.S. Cl.
CPC ........... *B65G 37/005* (2013.01); *B23Q 15/24* (2013.01); *B65G 37/00* (2013.01); *B65G 43/10* (2013.01);
(Continued)

(58) Field of Classification Search
CPC ...... B23Q 15/24; B65G 54/02; B65G 37/005; B65G 37/00; B65G 43/10; B65G 23/23;
(Continued)

(56) References Cited

U.S. PATENT DOCUMENTS 6,803,681 B2   10/2004   Faizullabhoy et al.
7,035,714 B2 *  4/2006   Anderson .............. B65G 13/02
                                                    198/358
(Continued)

FOREIGN PATENT DOCUMENTS

CN    1106736     8/1995
CN    103842276   6/2014
(Continued)

OTHER PUBLICATIONS

PCT International Search Report and Written Opinion of International Searching Authority dated May 4, 2017 corresponding to PCT International Application No. PCT/EP2016/077738 filed Nov. 15, 2016.
(Continued)

*Primary Examiner* — Mark A Deuble
(74) *Attorney, Agent, or Firm* — Cozen O'Connor (57) ABSTRACT

A method for moving a rotor onto a segment, a linear drive, a production machine, a machine tool, and a packaging machine comprising such a linear drive, wherein the actual speed of the rotor is ascertained using a sensor paired with the segment when the rotor is moved onto the segment, where the actual speed is selected by a control unit as the first target speed for the rotor, and after the target speed has
(Continued)

been determined for the rotor, the regulation of the actual speed is activated for the rotor, and where the actual speed of the rotor is then regulated in accordance with a conventional rule, wherein a rule variable is the ascertained actual speed and/or the position of the rotor such that jerking or an undesired acceleration is prevented during transition of the rotor onto the segment.

14 Claims, 7 Drawing Sheets

(30) Foreign Application Priority Data

| Nov. 24, 2015 | (EP) | 15196077 |
|---|---|---|
| Mar. 21, 2016 | (EP) | 16161433 |
| Mar. 21, 2016 | (EP) | 16161436 |
| Mar. 21, 2016 | (EP) | 16161437 |

(51) Int. Cl.

| G05B 19/19 | (2006.01) |
|---|---|
| B23Q 15/24 | (2006.01) |
| B65G 43/10 | (2006.01) |
| H02P 25/06 | (2016.01) |
| H02K 41/02 | (2006.01) |
| B65G 23/23 | (2006.01) |

(52) U.S. Cl.
CPC .............. *B65G 54/02* (2013.01); *G05B 19/19* (2013.01); *H02K 41/02* (2013.01); *H02P 25/06* (2013.01); *B65G 23/23* (2013.01); *G05B 2219/41327* (2013.01); *G05B 2219/41337* (2013.01); *G05B 2219/50229* (2013.01); *Y02P 90/265* (2015.11)

(58) Field of Classification Search
CPC .......... G05B 19/19; G05B 2219/41327; G05B 2219/50229; G05B 2219/41337; Y02P 90/265
USPC ......................................................... 198/619
See application file for complete search history.

(56) References Cited

U.S. PATENT DOCUMENTS

| 8,382,106 | B2 | 2/2013 | Noell | |
|---|---|---|---|---|
| 8,948,911 | B2* | 2/2015 | Haring | B65G 54/02 |
| | | | | 700/230 |
| 9,628,013 | B2 | 4/2017 | Boenke et al. | |
| 9,643,794 | B2 | 5/2017 | Wipf et al. | |
| 2010/0185320 | A1 | 7/2010 | Nemeth-Csoka et al. | |
| 2012/0247925 | A1* | 10/2012 | Cooke | B65G 43/00 |
| | | | | 198/617 |
| 2014/0097783 | A1* | 4/2014 | Hara | H02P 25/062 |
| | | | | 318/625 |
| 2014/0138212 | A1* | 5/2014 | van de Loecht | B65G 47/31 |
| | | | | 198/461.1 |
| 2015/0008768 | A1* | 1/2015 | Achterberg | H02K 41/03 |
| | | | | 310/12.11 |
| 2016/0139585 | A1 | 5/2016 | Hessenauer et al. | |
| 2016/0159578 | A1* | 6/2016 | Bierbooms | B65G 43/00 |
| | | | | 198/617 |
| 2016/0204612 | A1 | 7/2016 | Brogan et al. | |
| 2019/0047799 | A1* | 2/2019 | Spotti | B65G 35/06 |
| 2019/0199189 | A1* | 6/2019 | Brucker | B65G 54/02 |

FOREIGN PATENT DOCUMENTS

| CN | 105474526 | 4/2016 |
|---|---|---|
| CN | 207289067 U | 5/2018 |
| DE | 102008008602 | 12/2008 |
| DE | 102012025326 | 6/2014 |
| EP | 0409190 | 1/1991 |
| EP | 2141019 | 1/2010 |
| EP | 3024128 | 5/2016 |
| EP | 3024137 | 5/2016 |
| WO | WO2015/071228 | 5/2015 |

OTHER PUBLICATIONS

Office Action dated Aug. 2, 2019 issued in Chinese Patent Application No. 201680063623.0.

* cited by examiner

METHOD FOR MOVING A ROTOR, LINEAR DRIVE, AND PRODUCTION OR PACKAGING MACHINE

CROSS-REFERENCE TO RELATED APPLICATIONS

This is a U.S. national stage of application No. PCT/EP2016/077738 filed Nov. 15, 2016. Priority is claimed on EP Application No. EP15196047 filed Nov. 24, 2015, EP Application No. EP15196041 filed Nov. 24, 2015, EP Application No. EP15196077 filed Nov. 24, 2015, EP Application No. EP16161436 filed Mar. 21, 2016, Application No. EP16161437 filed Mar. 21, 2016, and EP Application No. EP16161433 filed Mar. 21, 2016, the contents of which are incorporated herein by reference in their entirety.

BACKGROUND OF THE INVENTION

1. Field of the Invention

The invention relates to a method for moving a rotor, a linear drive, and a production machine, machine tool, or packaging machine.

2. Description of the Related Art

Linear drives, also referred to as linear transport systems or multi-carrier systems, are widely used in the field of production machines, packaging machines or machine tools. A linear drive is used to move rotors on segments. A segment can be designed as a primary element of a linear motor. On the segment, a rotor or a plurality of rotors are moved. In such a case, a rotor is designed like a secondary element of a linear motor. The rotor is used to transport an item or workpiece. When transferring a rotor from one segment to another segment or from a regulated into a controlled mode and vice versa, this can result in undesired acceleration (jerking). Jerking is regularly understood as the temporal change of the acceleration of an element.

SUMMARY OF THE INVENTION

It is the object of the invention to provide a method for avoiding an undesired acceleration or undesired jerking when moving a rotor on a segment.

This and other objects and advantages are achieved in accordance with the invention by a first method for moving a rotor onto a segment via the steps of moving the rotor onto the segment at least in sections, ascertaining the actual speed of the rotor, providing the ascertained actual speed to a control unit, determining a target speed for the rotor from the actual speed of the rotor when moving the rotor onto the segment, and providing an electric current from the control unit for the segment for moving the rotor at the target speed.

In accordance with the invention, the electric current is provided in accordance with the target speed, where the target speed corresponds to the actual speed of the rotor after the movement of the rotor onto the segment.

The objects are also achieved by a second method for moving a rotor from one segment to a transport path via the steps of moving the rotor on the segment at least in sections, determining a target escape speed for the rotor, where the target escape speed is selected such that the rotor can leave the segment, and providing an electric current by the control unit for the segment to move the rotor at least at the target escape speed.

The objects are additionally achieved by a third method in which a controlled movement of the rotor is transferred into a regulated movement of the rotor, in particular, on a segment of a linear drive by the linear drive having segments and at least one rotor, where the rotor is configured to move on the segment and where, when changing from the controlled movement to the regulated movement, a controller is pre-initialized for the regulated movement such that the transfer primarily occurs in a jerk-free manner.

Under a jerk-free transfer of the movement of the rotor from a regulated movement into a controlled movement of the rotor (and vice versa), it is understood that the electric current or the voltage, which is applied to the segment, always runs without unforeseen change to the furthest extent possible.

The objects of the invention are also achieved by a fourth method by which a regulated movement of a rotor is transferred into a controlled movement of the rotor, in particular on a segment of a linear drive by the linear drive having segments and at least one rotor, where the rotor is configured to move on the segment and where, when transferring from the regulated movement to the controlled movement, a specified commutation angle is pre-initialized for the controlled movement such that the transfer primarily occurs in a jerk-free manner.

It is also an object of the invention to provide a linear drive configured to perform one of the aforementioned methods.

It is also an object of the invention to provide a production machine, a machine tool and a packaging machine having such a linear drive.

A segment is understood as a stator of a linear motor or a primary element of a linear motor. A rotor can be configured as a secondary element of a linear motor.

The segment is used to move the rotor on the segment along a direction. The movement is preferably initiated by a magnetic field.

The magnetic field is generated with the aid of coils of the segment via an electric current, where the electric current is provided by the control unit. Preferably, a control unit is respectively paired with a segment.

Segments are advantageously positioned sequentially to one another so that a rotor can be moved along a plurality of segments. The segments can also be configured to move a plurality of rotors.

The linear drive can be supplemented with conveyor belts in sections. The conveyor belt can also move a rotor onto a segment. The conveyor belt can also be configured to pick up a rotor from a segment. A conveyor belt is generally more inexpensive for transporting a rotor over a great distance.

Advantageously, the actual speed of the rotor is ascertained via a sensor, where the sensor is paired with the segment. Advantageously, the sensor can ascertain the actual speed of the rotor before and/or while moving the rotor onto the segment.

A feature of the invention is that, when moving the rotor onto the segment, in particular from a conveyor belt, regulation of the actual speed is initially deactivated. After moving the rotor onto the segment, meaning as soon as a part of the rotor is located on the segment, the activation of the speed regulation system occurs. The regulation of the actual speed only occurs within a regulated range, i.e., on segments, with which a sensor is paired.

Here, a method to transfer a rotor from a controlled movement to a regulated movement is presented. Furthermore, a method is presented where a rotor is transferred from a regulated movement into a controlled movement.

The transfer from the controlled movement to the regulated movement of the rotor on a segment can be used for a rotor that is moved onto the segment and for a rotor that is already located on the segment.

The movement of a rotor onto the segment is understood as a movement of the rotor, which is newly pushed onto the segment, for example.

A segment or a plurality of consecutive segments with a sensor or a plurality of sensors are referred to here as a regulated range. Advantageously, a sensor can be paired with a segment for the regulation of movement. Segments or conveyor belts without a sensor to determine the speed and/or the position of the rotor are referred to here as a controlled range. The sensor can be configured as a position sensor. The sensor is connected to the control unit and provides the ascertained position and/or actual speed of the rotor for the control unit.

The rotors advantageously have a way to equip the rotors with a workpiece or another item, such as a container to be filled or to be labeled.

The rotor moves on the segment with an actual speed. The target speed is advantageously calculated within the control unit. The target speed specifies the electric current that is provided by the control unit to the paired segment. In the case of a deviation of the actual speed from the target speed of the rotor, the electric current can be corrected for the segment.

In the case of a deviation of the actual speed from the target speed in the case of moving the rotor on the segment, the difference can be reduced with the aid of a proportional controller (P controller), a proportional-integral controller (PI controller) and/or a proportional-integral differential controller (PID controller). With the P, PI or PID controller, a change of the actual speed toward the target speed is performed with the least amount of acceleration possible.

Advantageously, the method can be used when transferring from a controlled range to a regulated range. In the case of the method, the sensor, which is paired with the segment, ascertains the actual speed of the rotor at a first point in time, when the rotor reaches the segment and/or the rotor is already located on the segment in sections.

The control unit can receive the actual speed at the first point in time. The control unit is ready for operation at the first point in time. At the first point in time, a regulation system of the actual speed for the rotor is not active. The ascertained actual speed of the rotor becomes the target speed for a second point in time. The control device switches on the regulation system of the actual speed at the second point in time. The ascertained actual speed of the rotor at the first point in time serves as a target speed for the rotor at the second point in time. The temporal distance between the first point in time and the second point in time is advantageously under 500 milliseconds.

After the second point in time, the rotor is located within the regulated range. Within the regulated range, the actual speed is regulated using a specified target speed.

If the segment has a plurality of coils to provide the magnetic field, which a three-phase alternating current is applied to, the speed is defined by the frequency of the three-phase alternating voltage. When accepting a rotor into the magnetic field, the phase angle of the three-phase alternating current is advantageously corrected such that the magnetic field is adapted without a phase shift into the movement of the rotor.

In an advantageous embodiment of the method, the ascertainment of the actual speed occurs with the aid of a sensor, which is paired with the segment.

An optical sensor, a hall sensor or a sensor that is based on magnetostriction is suitable as a sensor. The range in which the sensor can ascertain the position and/or the speed is advantageously not limited to the length of the segment. The sensor can also be integrated into the segment. For example, the sensor can detect a light signal or a magnetic field (originating from the rotor) to ascertain the position and/or the speed.

By pairing the sensor with the segment, a clear assignment of the ascertained actual speed or the ascertained position of the rotor on the segment can be provided to the corresponding control unit.

In another advantageous embodiment of the method, the actual speed is ascertained when moving onto the segment and via the ascertained actual speed and/or the target speed, the electric current for the segment is provided.

The electric current, in particular the three-phase alternating current, is used to generate the magnetic field to move the rotor on the segment. The target speed is specified in accordance with the object of the rotor.

The electric current is provided by the control unit for the segment, which is paired with the control unit. The phase and strength of the electric current are calculated, generated and transferred to the segment based on the target speed in relation to the actual speed of the rotor.

The specification of the target speed of the rotor advantageously occurs based on a motion sequence, where the motion sequence of the control unit is specified. The motion sequence can indicate when and at which speed a rotor at a specified location should move.

With the contemplated embodiment, a quick and easy regulation of the movement of the rotor on the segment can be implemented.

In another advantageous embodiment of the invention, in particular of the first suggested embodiment of the method, the rotor is moved with the aid of a conveyor belt or of another segment on the segment.

With the conveyor belt or another segment, the rotor is moved on the segment. The rotor can be moved, in particular applied, onto the segment at any point of the segment. Often, the rotor is pushed onto the segment at an end of the segment so that the magnetic field of the segment can pick up the rotor. The magnetic field directly adapts to the speed of the rotor after the segment acquires the rotor. Only afterwards does a change of the actual speed of the rotor occur by adapting the actual speed to the target speed.

With the aforementioned embodiment of the method, a rotor can be set into motion on the segment without a jerk or an acceleration affecting the rotor in an unadvantageous way.

In another advantageous embodiment of the invention, in particular of the second suggested method, the actual speed of the rotor on the segment is ascertained, where the ascertained actual speed is provided to a control unit.

In another advantageous embodiment of the invention, in particular of the first or second suggested method, the actual speed is ascertained during the movement and the electric current for the segment is provided based on the ascertained actual speed and/or the target speed.

Another advantageous embodiment of the invention, in particular of the third suggested method, comprises the steps of determining a speed of the rotor on the segment and ascertaining a commutation angle of an electric-current indicator, ascertaining a force-forming electric current of the electric-current indicator from a specified commutation angle [up to directly prior to the transfer] and the ascertained commutation angle, regulating the speed of the rotor using a speed control circuit, where the speed control circuit specifies the target value of a force-forming electric current for the electric current control circuit, and pre-initializing an integral part of the speed controller via the ascertained force-forming electric current.

Thereby, the specified commutation angle is still specified, in particular, up to directly prior to the transfer.

Accordingly, the controller for the regulated movement, which is pre-initialized in accordance with the third suggested method, has a speed control circuit and an electric-current control circuit.

Another advantageous embodiment of the invention, in particular of the fourth suggested method, comprises the steps of determining a speed of the rotor on the segment and ascertaining a commutation angle of an electric current in regulated mode, regulating the speed of the rotor using a speed control circuit, where the speed control circuit specifies the target value of a force-forming electric current for the electric-current control circuit, pre-initializing a specified commutation angle from the force-forming electric current and the ascertained commutation angle, and controlling the speed of the rotor by specifying the electric-current indicator, which rotates with a frequency ascertained from the target speed.

Thereby, several of the suggested process steps are taken prior to the transfer, meaning still in regulated mode and the other suggested process steps are taken during or after the transfer, generally meaning already during controlled mode. Still during the regulated movement, the speed of the rotor is determined, the commutation angle is ascertained, and the speed is regulated. During the transfer or during the controlled movement, the specified commutation angle is pre-initialized and the speed of the rotor is controlled.

In another advantageous embodiment of the method, the sensor has a detection range that goes beyond the segment, where the detection of the rotor's position and/or the ascertainment of the actual speed of the rotor occurs based on a calculation of an average value. The calculation of the average value can occur via filtering the sensor's signal.

The calculation of the average value advantageously occurs within the control unit. The average value of the actual speed is formed by a calculation of ascertained actual speeds at positions within the detection range of the sensor as long as the rotor is moved onto the segment. A progression of the actual speed of the rotor can be calculated from a plurality of the rotor's positions, ascertained at short time intervals, with the aid of the control unit. An average value of the progression of the actual value can be used as a basis for a target speed for the rotor when being taken onto the segment. By averaging the actual speed across a range of the rotor's movement until the rotor couples with the magnetic field of the segment, the actual speed can be advantageously determined with a higher level of accuracy.

In an advantageous embodiment of the linear drive, the linear drive has at least one segment, at least one sensor and at least one control unit, where the control unit is paired with the segment, where the position sensor is paired with the segment, where another segment or conveyor belt is provided to move a rotor onto the segment, where the sensor is provided to determine the actual speed of the rotor, where the control unit is configured to provide an electric current for the segment, where the electric current is provided to move the rotor in accordance with a target speed, and where the target speed corresponds to the actual speed after the movement of the rotor onto the segment.

In an alternative embodiment of the linear drive, the linear drive has at least one segment and at least one rotor, where the segment particularly has a sensor, where the linear drive has a control circuit and the control circuit is configured to regulate the speed of the rotor on the segment, and where the third suggested method is provided for a change of a controlled movement of the rotor to a regulated movement of the rotor and/or the fourth method is provided for a change from the regulated movement of the rotor to the controlled movement of the rotor.

In another advantageous embodiment of the linear drive, the sensor has a detection range extending beyond the segment. In the presently contemplated embodiment, the sensor can detect the position and/or the actual speed of the rotor, even if the rotor still has not reached the segment. With this embodiment, a particularly accurate determination of the actual speed can occur because the position and/or the actual speed is ascertained from the beginning of the detection range on.

In another advantageous embodiment of the linear drive, the control device has a current converter and the current converter is provided to provide the electric current for the segment.

The current converter advantageously provides a three-phase alternating current with a configurable frequency for the segment. The frequency of the three-phase alternating current is proportional to the target speed of the rotor. The phase of the three-phase alternating current is selected such that the rotor is synchronously introduced into the magnetic field. Due to the combination of the control device to calculate the ascertained position and/or actual speed of the rotor with the current converter to provide the electric current for the segment, the transfer times are short.

Thereby, in an advantageous manner, a calculation of the target speed and/or a provision of the electric current required for this can take place in real time.

In an advantageous embodiment, the linear drive is configured to implement the aforementioned method.

With the configuration of the linear drive, a particularly jerk-free movement of the rotor can occur. In particular, during a transfer of the rotor from the controlled range into the regulated range and from the regulated range into the controlled range, movement of the rotor is possible without unadvantageous jerking.

In an advantageous embodiment of the linear drive, this has a control device, wherein the control device is configured to control and/or regulate the movement of the rotor.

The control device in combination with the control units leads to an improved control and/or regulation of movement. The control device is used for the communication of the control units among one another. Furthermore, the control device can be configured to provide the target speed of the rotor to the control units. In particular, in the case of a movement of a plurality of rotors on the linear drive and/or on a segment, the control device is used to provide signals, by which the control units ensure a control and/or regulation in coordination with one another of the movement of the rotors on the respective segment. The control device can also be configured to provide signals based on a provided motion sequence for one or a plurality of rotors.

In controlled mode, when transferring from a first segment to another segment, an alignment of the other segments occurs based on the operational state of the first segment or the respectively paired control device.

Advantageously, with the combination of a control device and a plurality of control units, a simplified control and/or regulation of the rotor's movement can be designed.

In another advantageous embodiment, the linear drive has a plurality of segments, where a control unit is paired with the respective segments, where the segments have sensors at least in part, where the control device is provided to provide signals for a plurality of control units, and where the control unit is configured to regulate the actual speed of the rotor based on the target speed of the rotor.

Advantageously, all control units are provided to regulate the actual speed of the rotor on their paired segment.

The pairing of a control unit with a segment is used for the improved control of the segment. Furthermore, control units are available for purchase, which are well-suited to drive a segment. For example, a SINAMICS S120 made by Siemens AG is suitable for controlling a segment. Furthermore, control units are advantageously connected among one another via a communication network. A real-time capable network can be used as a communication network, such as a quick network connection (Drive-CliQ).

The control device is used to provide signals for the control units. Furthermore, the control device can be used to coordinate the movement of the rotors based on a motion sequence. The control device can coordinate the movement of the rotor from one segment to another segment by emitting signals to the control units that are involved in the transfer.

Furthermore, the control device can also be used to initialize the individual functions of the control device. For example, the control device is used to temporarily switch off the speed regulation system of the control units of the segment on which a rotor is moved.

A motion controller, such as a SIMOTION motion controller or a SIMATIC motion controller (each made by Siemens AG), is suitable as control devices.

Advantageously, by coordinating the control units via the control device, communication can be improved and the error susceptibility of the control system and/or the regulation system can be reduced.

The disclosed embodiments of the invention are advantageously used in the case of a packaging machine, a labeling machine, a filling plant, a machine tool or an industrial installation, which uses a linear drive described here.

A transfer of a rotor from one segment to a conveyor belt, where the conveyor belt adjoins the segment, occurs as described in the following.

When changing over from regulated mode to controlled mode, the following situations must be differentiated.

The goal is respectively transferring from the regulated movement to the controlled movement without triggering jerking or an unforeseen acceleration of the rotor on the segment.

When moving the rotor in regulated mode (of the segment or the linear drive), the speed control circuit v-RK regulates the speed at least to an escape speed, in order to transfer the rotor from one segment to a transport path, such as to a conveyor belt. The escape speed is configured such that the rotor can leave the segment due to its mass inertia and can overcome the potential barrier of the magnetic field between the segment and the rotor.

A deactivation of the speed control circuit subsequently occurs. Due to the escape speed, the rotor is now passively transferred to the conveyor belt.

The method to transfer from a controlled movement to a regulated movement occurs by ascertaining a force-forming electric current from the commutation angle specified up until prior to the transfer and the ascertained actual commutation angle. With the speed controller, the force-forming component of the electric current is specified as a target value, for which an integral part of the speed controller is pre-initialized by the ascertained force-forming electric current. In turn, the target value of the force-forming electric current is, in particular, compared with a corresponding measured actual value, in order to ultimately determine an appropriate voltage within the current controller. When transferring into the regulated movement, thereby, the same force-forming electric current flows as it did prior to the transfer.

In order to ascertain the force-forming part of the electric current (=force-forming components of the electric current, I-q), a difference of the commutation angle $\varphi'-\varphi$ is determined between the assumed commutation angle $\varphi'$ in controlled mode and the actual commutation angle $\varphi$. In particular, this occurs in the I/f mode of the current regulator. The required force-forming electric current for the regulated mode is determined from the commutation angles, in particular, from the difference of the commutation angles $\varphi'-\varphi$.

With the provided measures, a jerk-free transfer from the controlled movement to the regulated movement can occur.

When transferring from the regulated movement of the respective rotor to the controlled movement of the rotor, the determination of the speed of the rotor and the ascertainment of the commutation angle occurs while still in regulated mode, for which the speed of the rotor continues to be regulated using a speed control circuit. For this purpose, the speed control circuit specifies the target value of a force-forming electric current for the current control circuit. The commutation angle $\varphi'$ assumed in I/f mode is pre-initialized based on the measured commutation angle $\varphi$ and the force-forming electric current ascertained in regulated mode. Thereby, the force-forming electric current component in the case of the regulated movement becomes the force-forming electric current component in controlled mode.

A specification of a value as a first target value for a regulation system can be understood as a pre-initialization.

Due to the possibility of transferring from a controlled movement of a rotor to a regulated movement of the rotor on a segment and vice versa, a segment or a linear drive can, for example, be divided into a regulated part of the segment or respectively of the linear drive and into a controlled part of the segment or respectively of the linear drive.

An embodiment of the linear drive has at least one segment and at least one rotor, where the segment has a sensor, where the linear drive has a control circuit and the control circuit is configured to regulate the speed of the rotor on the segment, and where the aforementioned method is provided for a change of a controlled movement of the rotor to a regulated movement of the rotor and/or the other aforementioned method is provided for a change from the regulated movement of the rotor to the controlled movement of the rotor.

Advantageously, a control circuit is integrated into the control unit and/or the control device. A control circuit advantageously comprises a current control circuit, a speed control circuit and a position control circuit. Thereby, the position control circuit is configured to regulate the position of the rotor on the respective segment or a plurality of segments. Furthermore, the speed control circuit is configured to regulate the speed of the rotor on the respective segment or a plurality of segments. Furthermore, the current control circuit is configured to regulate the electric current for the segment. Advantageously, the current control circuit is activated during operation of the linear drive. The speed control circuit is then preferably activated when the at least one rotor is located on the segment or a plurality of segments are in a regulated mode.

The position regulation system is preferably then active if the position of the rotor plays an emphasized role. The control circuits can be built upon one another so that the speed control circuit accesses the current control circuit and/or can apply a target value to this. Furthermore, the position control circuit can specify a target value to the speed control circuit or intervene in its function.

Respectively, the control circuit is advantageously designed as a P controller, a PI controller, and/or as a PID controller.

Here, a regulation of the rotor's speed is described. The rotor has a speed, which is referred to as an actual speed. The speed (as a control factor) of the rotor is referred to as the actual speed. This actual speed is measured with the aid of the sensor.

In the following, a controlled or regulated movement of the rotor is used synonymously with a controlled or a regulated mode.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE INVENTION

In the following, the invention is described in detail based on the figures. Thereby, the features of the invention showed in the figures can be combined into new exemplary embodiments without going beyond the scope of the invention, in which.

DETAILED DESCRIPTION OF THE EXEMPLARY EMBODIMENTS

Figure 1:
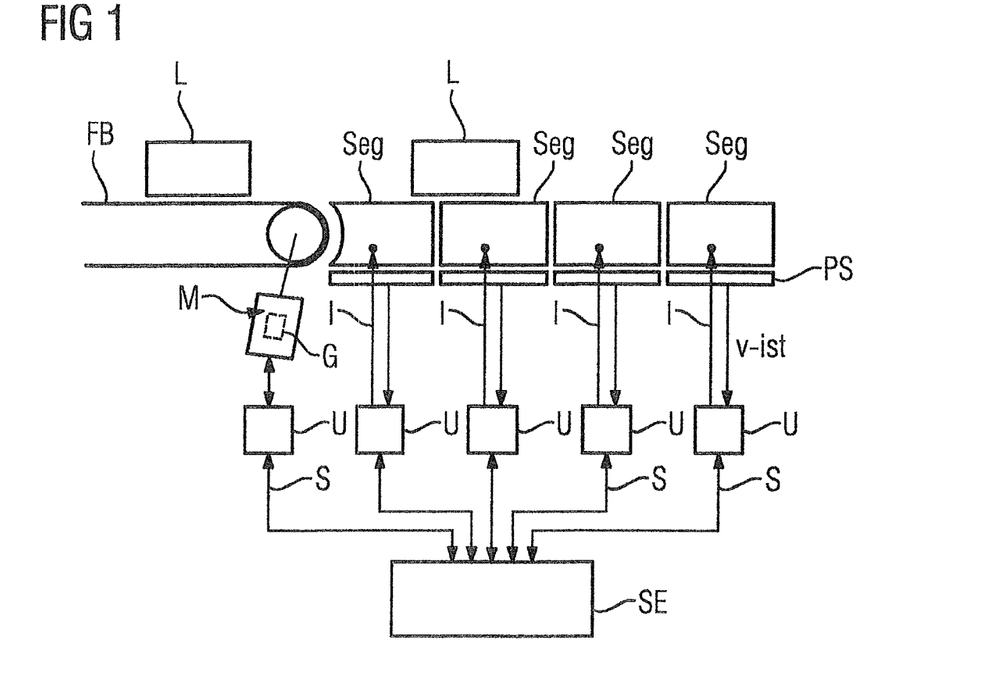
FIG. 1 a linear drive with a conveyor belt in accordance with the invention.

FIG. 1 shows a linear drive LA with a conveyor belt FB. The conveyor belt FB is used to provide a rotor L for the segments Seg, where the segments and the conveyor belt are arranged next to each other. The conveyor belt FB has a motor M for movement, where the motor M is controlled by a control unit U. Arranged, next to the conveyor belt FB are segments Seg that are respectively connected to a control unit U. A sensor PS is paired with each of the segments Seg. The sensor PS is used to ascertain the position and/or the actual speed v-ist of the rotor L on the segment Seg, which the sensor PS is paired with. The sensor PS is respectively connected to the control unit U, which is paired with the segment Seg. In an advantageous embodiment, the sensor PS is integrated into the segment Seg.

The control units U are connected to a control device SE. The control device SE is used to provide signals S for the respective control unit U. In the configuration shown here, the segments Seg can be configured as primary elements of linear motors. The control unit U is respectively configured as a converter or a current converter. The control unit U is used to supply the segments Seg with voltage or electric current. The electric current I for the segments Seg is used to generate a magnetic field via coils of the segment Seg. The magnetic field is used to position the rotor L on the segment Seg. The rotor L is regularly moved across a plurality of segments Seg. The segments Seg and the sensors PS form a regulated range CL (of a closed-loop type). The motor M can be equipped with a gauge G. The optional gauge G of the motor is used to ensure the correct function of the motor M, and thereby of the conveyor belt FB. If a rotor L is moved onto a segment Seg, for example, by the conveyor belt FB or by an adjacent segment Seg, the sensor PS is used to ascertain the actual speed v-ist of the rotor. The actual speed v-ist is ascertained during the movement of the rotor L to the segment Seg. The actual speed v-ist is provided to the control unit U. The actual speed v-ist of the rotor L is used by the control unit U as an input factor for regulating the actual speed v-ist of the rotor L on the segment Seg, which is paired with the control unit U. The actual speed v-ist is provided to the control unit U by the sensor PS.

With the illustrated configuration, for example, a rotor can be moved from a controlled range OL (from an open loop) to a regulated range CL.

Figure 2:
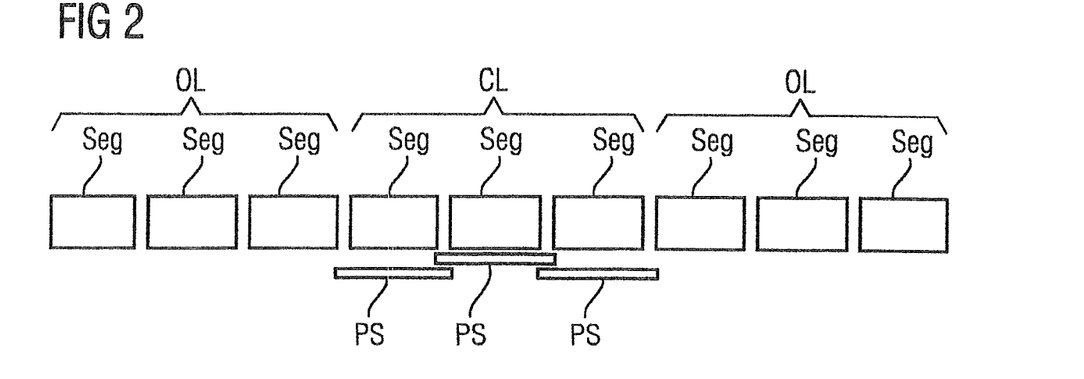
FIG. 2 sequentially consecutive segments in accordance with the invention.

FIG. 2 shows segments Seg in a sequential row. The segments Seg have sensors PS in part. The sensors PS have a detection range, which protrudes beyond the borders of the segment Seg. The range, in which a sensor PS is paired with the segments Seg, is referred to as a regulated range CL. Segments Seg, which do not have a sensor PS or to which no sensor PS has been paired, are referred to as a controlled range OL.

The movement of the rotor, in particular the actual speed v-ist of the rotor L, is only controlled within the controlled range OL by a specification to the control unit U.

The movement of the rotor L, in particular, the actual speed v-ist of the rotor L, is regulated within the regulated range CL based on the ascertained actual speed.

The regulation of the actual speed v-ist occurs within the control device SE and/or within the control unit U.

Both the segments Seg of the regulated range CL, as well as the segments Seg of the controlled range OL, are used to move the rotor L. The sensors PS are, for example, configured as optic sensors, hall sensors or magnetostriction sensors. Sensors PS, which are merely configured to ascertain the position of the rotor L, can transmit a plurality of ascertained positions of a rotor to the control unit U. The control unit U calculates the actual speed of the rotor L from the plurality of the rotor's L positions and the transfer time.

Then, the calculation of the actual speed v-ist of the rotor L occurs within the control device SE or within the control unit U. Based on the actual speed v-ist, a regulation of the actual speed v-ist of the rotor L occurs, in particular when transferring a rotor L from one segment Seg to another segment Seg.

Figure 3:
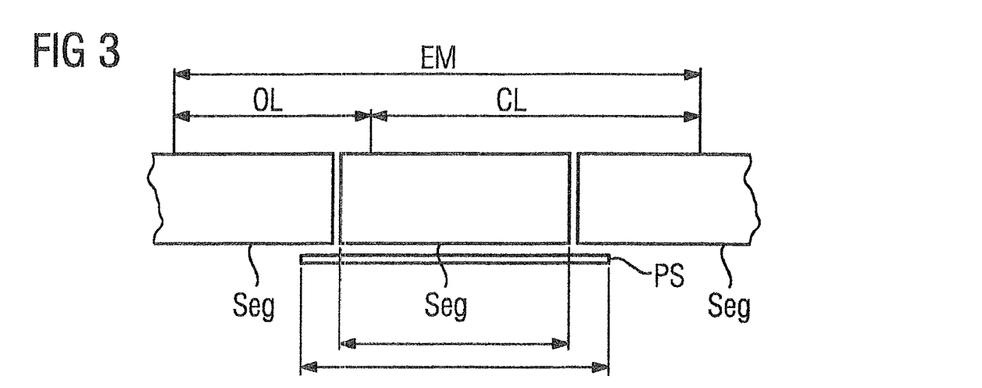
FIG. 3 segments and a sensor in accordance with the invention.

FIG. 3 shows segments and a sensor PS. The sensor PS of the middle segment Seg has a detection range, which is greater than the length of the segment Seg. The detection range of the sensor PS runs across the entire length of the sensor PS, as it is symbolized by the arrow under the sensor.

Figure 4:
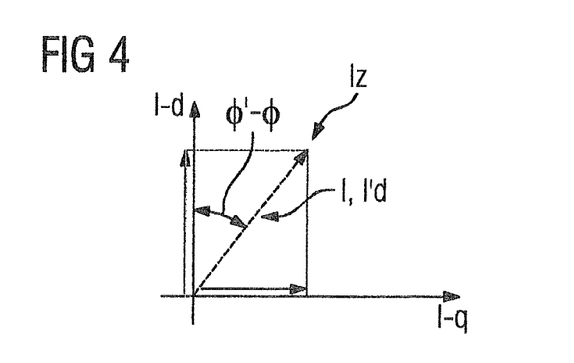
FIG. 4 an electric-current diagram in accordance with the invention.

FIG. 4 shows an electric-current diagram. The electric-current diagram shows the force-forming component I-q of the electric current and the field-forming component I-d of the electric current and the commutation angle $\varphi$ and the difference $\varphi'-\varphi$ between the assumed commutation angle $\varphi'$ and the actual commutation angle $\varphi$. The commutation angle $\varphi$ indicates the (actual) direction of an electric-current indicator Iz. The difference $\varphi'-\varphi$ indicates the angle between the provided field-forming component of the electric current I-d' and the actually present field-forming component of the electric current I-d. The assumed commutation angle $\varphi'$ can be provided by the control unit U for the controlled movement of the rotor (L).

If a transfer from a controlled movement of the rotor (L) and a regulated movement of the rotor (L) should occur, then a force-forming part of the electric current I-q must be pre-initialized based on the difference of the assumed commutation angle $\varphi'$ and the actual commutation angle $\varphi$. The change of the force-forming component of the electric current is then zero and no force impact on the rotor occurs during the transfer from the regulated movement to the controlled movement.

The same applies vice versa for the transfer from the regulated movement of the rotor L to the controlled movement of the rotor L. Here, the assumed commutation angle $\varphi'$ for the I/f-controlled mode is pre-initialized such that the force-forming part of the electric current I-q remains constant.

In the regulated mode, the commutation angle $\varphi$ is either measured or calculated by a model (based on the drive parameters).

Figure 5:
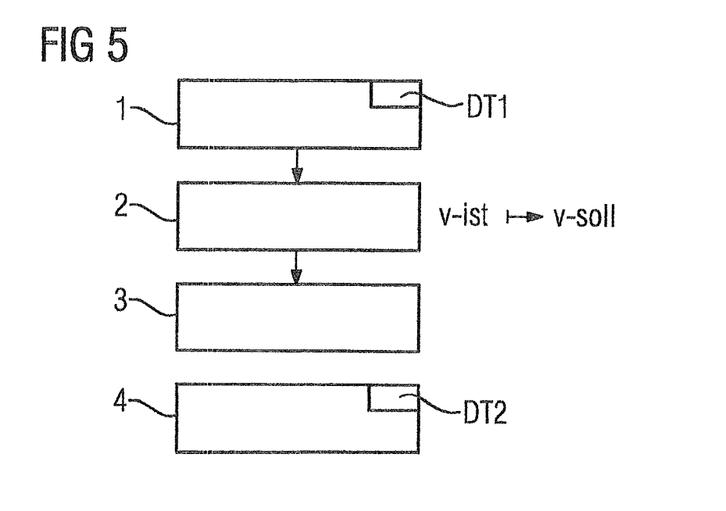
FIG. 5 a flowchart of a method for regulating the actual speed of the rotor on a segment in accordance with the invention.

FIG. 5 shows a method for regulating the actual speed v-ist of the rotor L on a segment Seg. At a first step 1, the rotor L is moved onto the segment Seg. The first step 1 occurs within a first time range DT1. The rotor L is moved onto the segment either by a conveyor belt FB or by another segment Seg. At a second step, the actual speed v-ist of the rotor L is ascertained during the movement of the rotor L to the segment Seg. During a first time range DT1, the actual speed v-ist regulation is not yet activated. The ascertained actual speed v-ist of the rotor L is transmitted to the control unit U and/or to the control device SE. The control unit U or the control device SE receives the ascertained actual speed of the rotor. The ascertained actual speed v-ist is used as a basis for determining the target speed v-soll in the actual speed regulation. At a second process step 2, the target speed v-soll is set as the ascertained actual speed. At a third process step 3, the actual speed v-ist regulation of the rotor L is activated subsequent to the first time range DT1.

At a fourth process step, the rotor is moved to a further segment Seg or to a conveyor belt FB again. If a sensor PS is also paired with the further segment Seg, then the process steps 1, 2 and 3 described in the above can be repeated.

If no sensor PS is paired with the further segment or the conveyor belt FB, the ascertainment of the actual speed within the second time range DT2 occurs with the aid of the sensor of the segment Seg, from which the rotor is moved to the further segment or conveyor belt. For this, it is advantageous if the detection range of the sensor PS protrudes beyond the end of the segment Seg.

The ascertained actual speed v-ist of the segment, in this case, is transmitted to the control unit U, which is paired with the further segment or the conveyor belt FB. The control unit U, which is paired with the further segment Seg or the conveyor belt, sets the actual speed v-ist of the rotor on the end of the segment Seg as a new target speed v-soll of the rotor L on the further segment Seg or on the conveyor belt FB. Based on the new target speed v-soll, the movement of the rotor L on the further segment Seg or the conveyor belt FB is controlled.

Ascertaining the actual speed at a plurality of points, in particular at a plurality of times points within the first time range DT1 and/or the second time range DT2 is advantageous.

In the case of movement of a plurality of rotors successively onto the segment Seg, the above-described method can be used. Where applicable, for this, the first time range DT1 and/or the second time range DT2 must be shortened.

Figure 6:
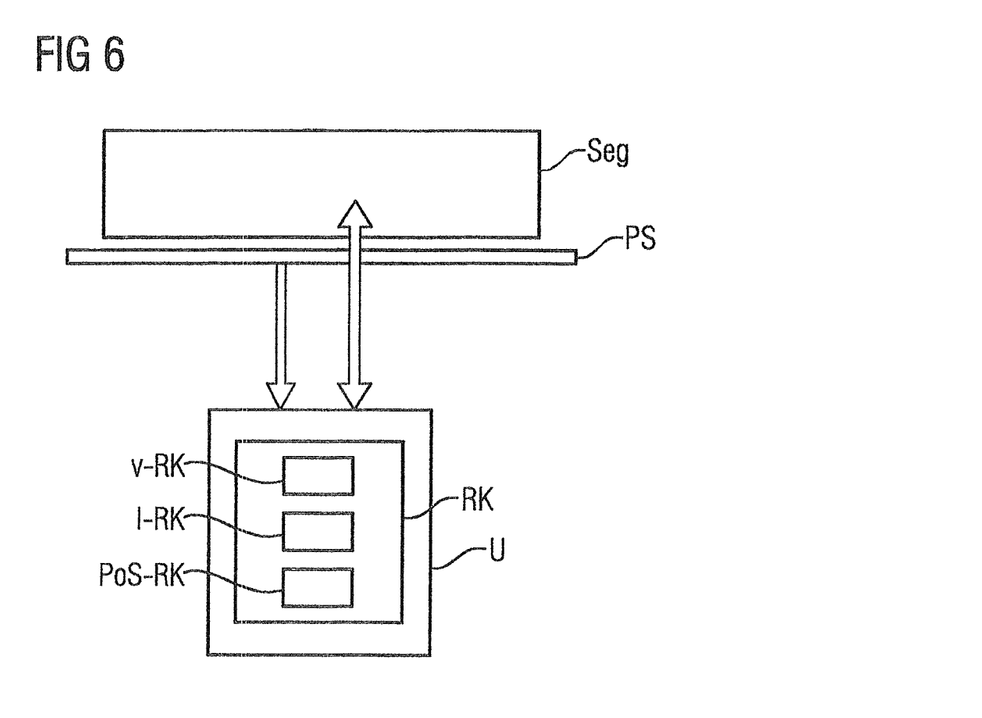
FIG. 6 a control circuit in accordance with the invention.

FIG. 6 shows a segment Seg and a control unit U with a control circuit RK. The segment Seg has a sensor PS. The sensor PS is configured to ascertain the speed of the rotor L and/or to ascertain the position of the rotor L on the segment Seg. The sensor PS provides the ascertained position of the rotor L and/or the ascertained speed of the rotor L to the control circuit RK. Here, the control circuit RK is integrated within the control unit U. The control circuit RK can also at least partially be integrated in the control device SE of the linear drive LA. The segment Seg in connection with the rotor L and the control unit U can be either in the controlled mode OL or in the regulated mode CL.

The control circuit RK has an electric-current control circuit I-RK, a speed control circuit v-RK and a position control circuit Pos-RK. The electric-current control circuit I-RK is used to regulate the electric current for the electric-current supply of the segment Seg. The speed control circuit v-RK is used to regulate the speed of the rotor L on the segment Seg. The position control circuit Pos-RK is configured to regulate the position of the rotor L on the segment Seg.

In regulated mode CL of the rotor's L movement on the segment Seg, the speed control circuit v-RK is activated. In the activated state of the speed control circuit v-RK, the sensor PS is used to provide the actual value of the rotor's L speed on the segment Seg.

When changing over from controlled mode OL to regulated mode CL, the speed control circuit v-RK is deactivated. However, the electric-current control circuit I-RK also remains activated in controlled mode OL. The electric-current control circuit I-RK maintains its target value via the speed control circuit v-RK or by the control device SE.

In regulated mode, the speed control circuit v-RK advantageously indicates the at least one target value (e.g. of an electric current) for the electric-current control circuit I-RK.

The electric-current control circuit I-RK is advantageously provided to regulate the electric current I-q, I-d, in its field-forming component I-d, its force-forming component I-q and thereby to specify and/or ascertain, in particular to measure or calculate, the commutation angle $\varphi$, $\varphi'$.

Figure 7:
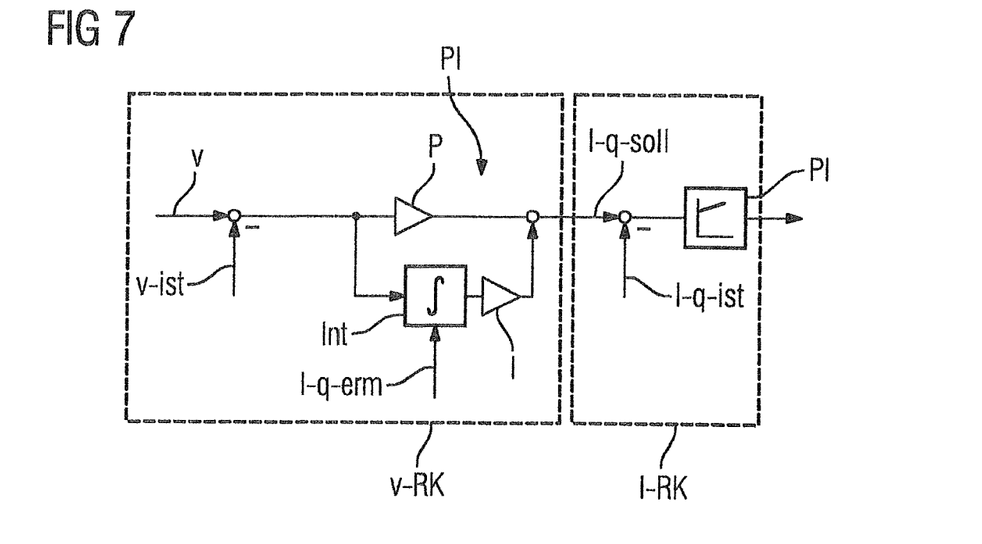
FIG. 7 a schematic representation of an embodiment of the third suggested method in accordance with the invention.

FIG. 7 shows a schematic representation of an embodiment of the third suggested method. In order to transfer a controlled movement OL of a rotor L into a regulated movement CL of the rotor L, a controller v-RK, I-RK for the regulated movement CL is pre-initialized such that the transfer primarily is performed without jerking.

For this purpose, a speed v-ist of the rotor L on the segment Seg is initially determined and a commutation angle φ of an electric-current indicator I is ascertained. A force-forming electric current I-q-erm of the electric-current indicator Iz is ascertained from a commutation angle φ' assumed up until directly before the transfer and the ascertained commutation angle φ, where this force-forming electric current I-q-erm is used for pre-initializing an integral part of the speed controller v-RK.

FIG. 7 shows a possibility of the embodiment where a difference is formed from the target speed v-soll with the actual speed v-ist. The speed difference is transferred to a PI controller. On one branch, the PI controller has an integration element Int and an integral amplifier I. On the other branch, the PI controller has a proportional amplifier P. The integration element Int has the ascertained force-forming part of the electric current I-q-erm as an additional input factor. The ascertained force-forming part of the electric current I-q-erm, in particular, is used to determine the initial value of the output of the integration value.

The outputs of both branches are added to the target value of the force-forming component of the electric current I-q-soll.

In order to regulate the speed v, the speed control circuit v-RK thereby ascertains the target value of a force-forming electric current I-q-soll. The target value of the force-forming electric current I-q-soll is supplied to the electric current control circuit I-RK. The electric-current control circuit I-RK then ascertains a correct voltage, for which, where applicable, a measured force-forming electric current I-q-ist is used. The voltage is provided to the corresponding control unit U and/or the control device SE.

Figure 8:
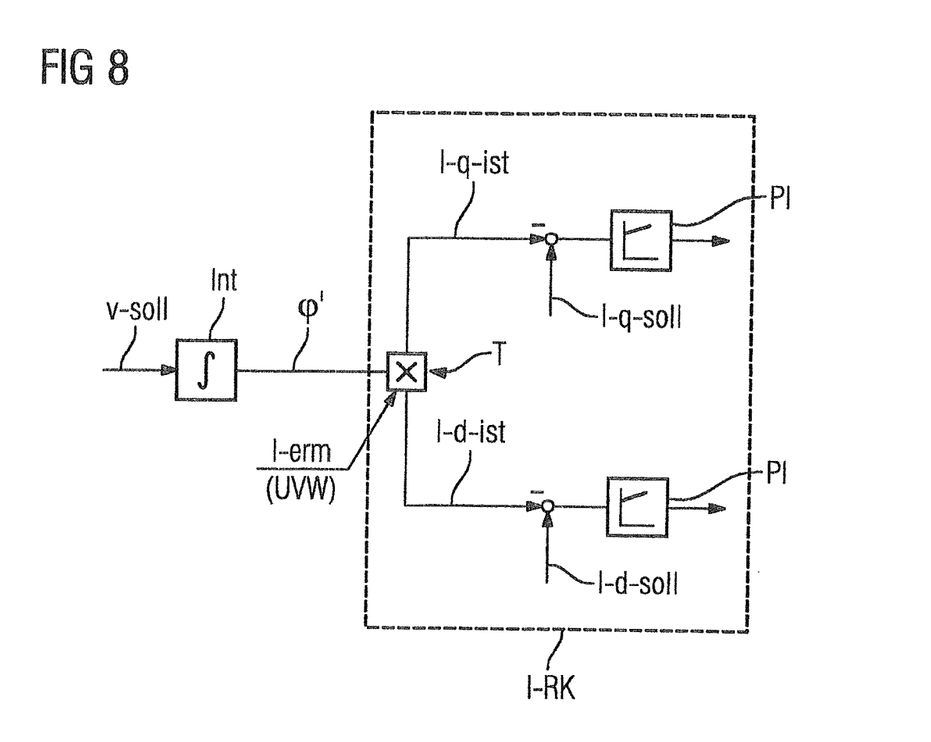
FIG. 8 a schematic representation of an embodiment of the fourth suggested method in accordance with the invention.

FIG. 8 shows a schematic representation of an embodiment of the fourth suggested method. In order to transfer from a regulated movement CL of a rotor L into a controlled movement OL of the rotor L, an assumed commutation angle φ' for the controlled movement is pre-initialized such that the transfer is primarily performed free of jerk.

For this purpose, the assumed commutation angle φ' is ascertained from the target speed v-soll. Ascertaining the assumed commutation angle φ' in particular occurs by integrating the target speed. The assumed commutation angle φ' is supplied to the electric-current control circuit I-RK. The electric-current control circuit has the ascertained (three-phase AC) current I-erm as another input factor. The information (U V W) is used to indicate that the ascertained electric current I-erm is a three-phase AC current. With the aid of the assumed commutation angle φ', the electric current I-erm is divided into the actual value of the field-forming component of the electric current I-d-ist and into the actual value of the force-forming component of the electric current I-q-ist via a current divider T.

The respective actual value of the electric current I-q-ist, Id-ist is compared with the corresponding target value I-q-soll, I-d-soll. The difference of the corresponding electric current values is respectively used as input factors for a PI controller (proportional-integral controller) PI, respectively. The outputs of the PI controller PI are advantageously used as input factors for the respective control unit U.

The output of the respective PI controller can be advantageously converted into voltages with the aid of a transformation element (not shown). The voltages are then advantageously transmitted to the control units and are used to indicate the supply voltage for the respective segment Seg.

In other words, a speed v-soll is initially ascertained from the regulated movement of a rotor L. A speed v-ist of the rotor L on the segment Seg is determined to ascertain the regulated movement CL. Furthermore, the assumed commutation angle φ of an electric current I is ascertained. As a result, during the regulated movement CL, a speed control circuit v-RK specifies the target value of a force-forming electric current I-q for the electric-current control circuit I-RK. In order to transfer into the controlled movement, the assumed commutation angle φ' is pre-initialized from the force-forming electric current I-q and the ascertained commutation angle φ, where control of the rotor's L speed is performed by specifying the electric-current indicator I and the components I-q and I-d of the electric-current indicator (Iz, see FIG. 4) are ascertained based on an electric-current control circuit I-RK.

In summary, the disclosed embodiments of the invention relate to, inter alia, a method for moving a rotor L on a segment Seg, to a linear drive LA, to a production machine, to a machine tool, and to a packaging machine comprising such a linear drive LA. When the rotor L is moved on a segment Seg, the actual speed v-ist of the rotor is ascertained using a sensor PS that is paired with the segment Seg. The actual speed v-ist is selected by a control unit U as the first target speed v-soll for the rotor L. After the target speed v-soll has been determined for the rotor L, the regulation of the actual speed v-ist is activated for the rotor L. The regulation of the actual speed v-ist of the rotor L then occurs in accordance with a conventional regulation system, where the regulation system variable is the ascertained actual speed v-ist and/or the position of the rotor L. The aforementioned method being executed prevents jerking or an undesired acceleration during the transfer of the rotor L onto a segment Seg.

Figure 9:
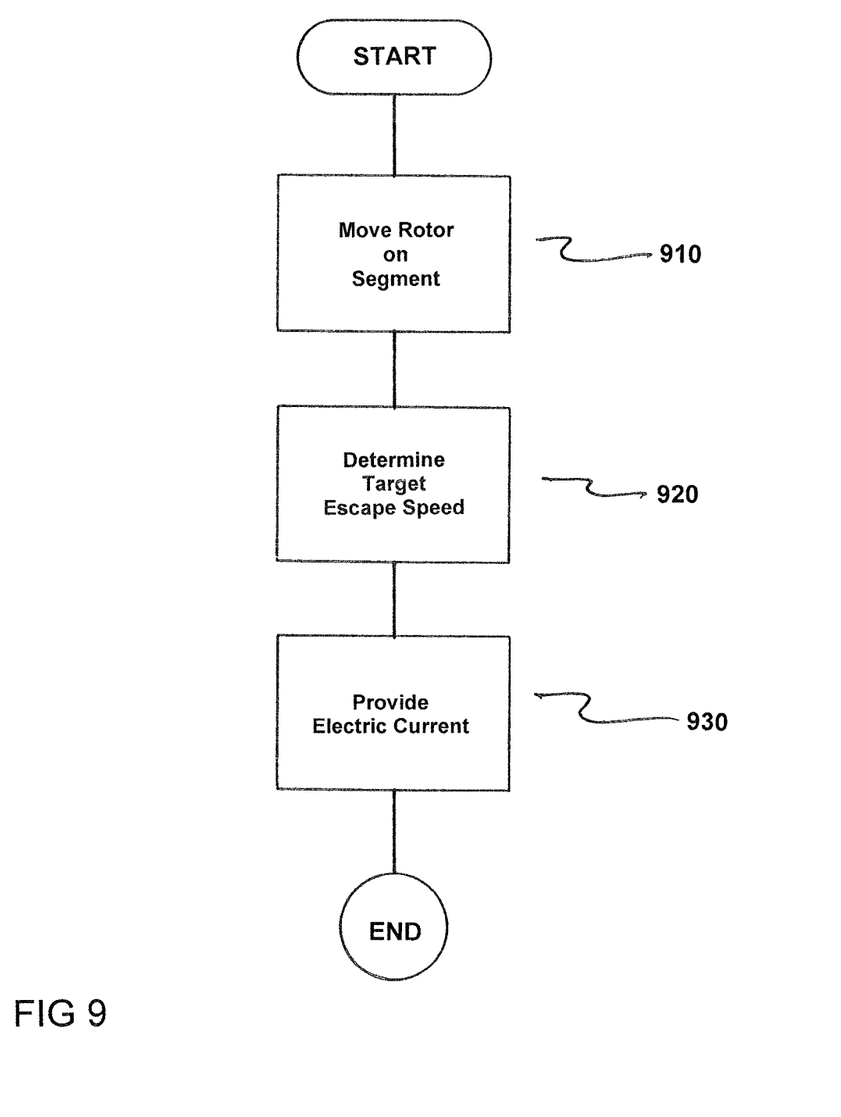
FIG. 9 is a flowchart of the method for moving a rotor from a segment onto a transport path in accordance with the invention.

FIG. 9 is a flowchart of a method for moving a rotor L from a segment Seg onto a transport path. The method comprises moving the rotor L on the segment Seg at least in sections, as indicated in step 910.

Next, a target escape speed v-F-soll for the rotor L is determined, as indicated in step 920. Here, the target escape speed v-F-soll is selected to ensure the rotor L can leave the segment Seg.

An electric current I is now provided from the control unit U for the segment Seg to move the rotor L at least at the target escape speed v-F-soll, as indicated in step 930.

Figure 10:
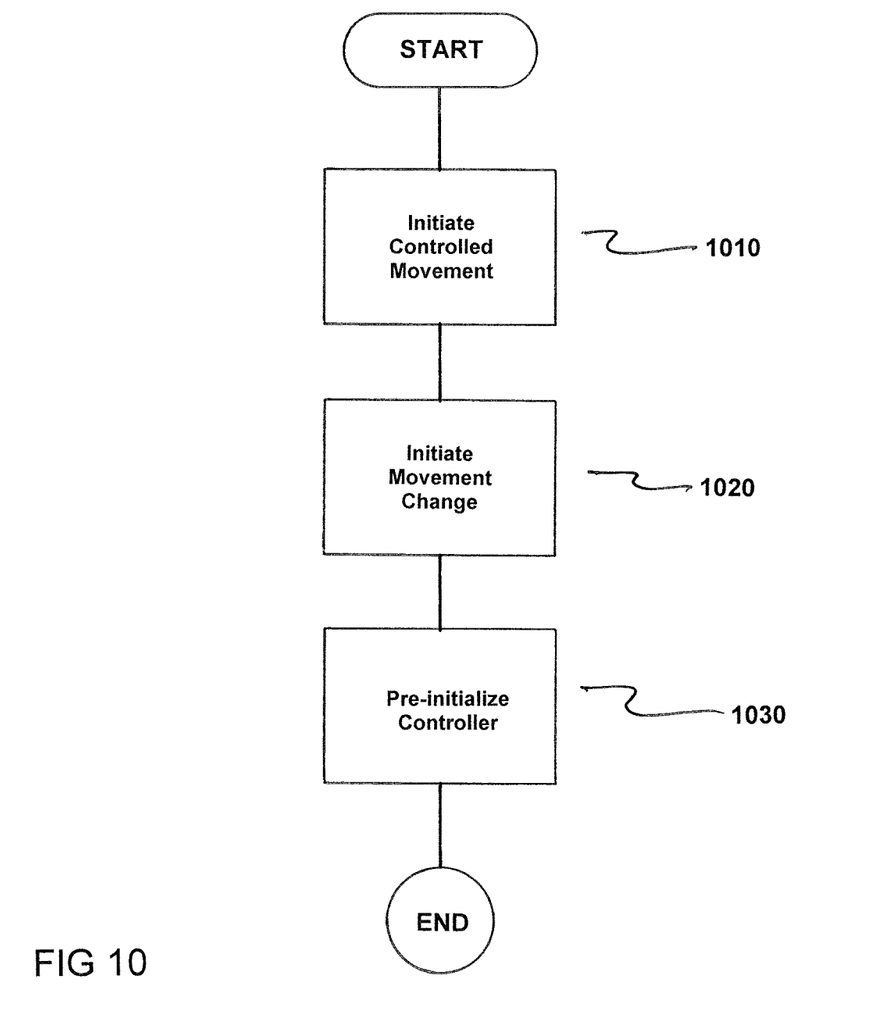
FIG. 10 is a flowchart of the method for transferring the controlled movement of a rotor into a regulated movement of the rotor on a segment of a linear drive in accordance with the invention.

FIG. 10 is a flowchart of a method for transferring a controlled movement of a rotor L into a regulated movement of the rotor L on a segment Seg of a linear drive LA having segments Seg and at least one rotor L, where the rotor L is configured to move on the segment Seg. The method comprises initiating a controlled movement of the rotor L on the segment Seg, as indicated in step 1010. Next, a change from the controlled movement of the rotor on the segment Seg to an unregulated movement on the segment Seg is initiated, as indicated in step 1020.

Next, a controller for the regulated movement is pre-initialized when changing from the controlled movement to the regulated movement such that the transfer is performed substantially jerk free, as indicated in step 1030.

Figure 11:
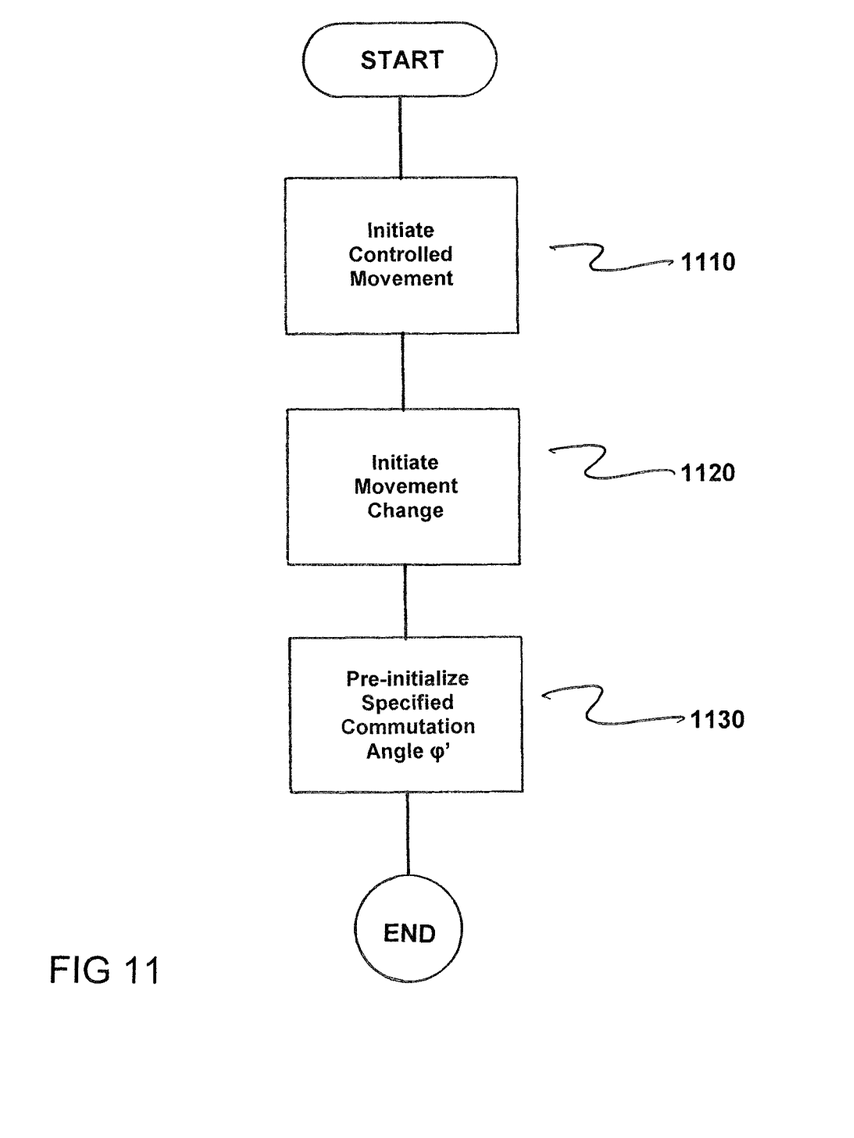
FIG. 11 is a flowchart of the method for transferring the controlled movement of a rotor into a regulated movement of the rotor on a segment of a linear drive in accordance with an embodiment of the invention.

FIG. 11 is a flowchart of an embodiment of the method for transferring the regulated movement of the rotor L into the controlled movement of the rotor L on a segment Seg of the linear drive LA having segments Seg and at least one rotor L configured to move on the segment Seg. The method comprises initiating a controlled movement of the rotor L on the segment Seg, as indicated in step 1110.

Next, a change from the controlled movement of the rotor on the segment Seg to an unregulated movement on the segment Seg is initiated, as indicated in step 1120.

Next, a specified commutation angle $\varphi'$ is pre-initialized for the controlled movement when transferring from the regulated movement to the controlled movement such that the transfer is performed substantially jerk free, as indicated in step 1130.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for transferring a controlled movement of a rotor into a regulated movement of the rotor on a segment of a linear drive having segments and at least one rotor, the rotor being configured to move on the segment, the method comprising:
    initiating a controlled movement of the rotor on the segment;
    changing from the controlled movement of the rotor on the segment to an unregulated movement on the segment; and
    pre-initializing a controller for the regulated movement when changing from the controlled movement to the regulated movement such that the transfer is performed substantially jerk free.

2. The method as claimed in claim 1, further comprising:
    determining an actual speed of the rotor on the segment and ascertaining a commutation angle of an electric-current indicator;
    ascertaining a force-forming electric current of an electric-current indicator from a specified commutation angle and the ascertained commutation angle;
    regulating a speed of the rotor via a speed control circuit which specifies a target value of a force-forming electric current for an electric current control circuit; and
    pre-initializing an integral part of the speed controller via the ascertained force-forming electric current.

3. The method as claimed in claim 2, wherein ascertaining the actual speed occurs aided by a sensor, which is paired with the segment.

4. A method for transferring a regulated movement of a rotor into a controlled movement of the rotor on a segment of a linear drive having segments and at least one rotor configured to move on the segment, the method comprising:
    initiating a controlled movement of the rotor on the segment;
    changing from the controlled movement of the rotor on the segment to an unregulated movement on the segment; and
    pre-initializing a specified commutation angle for the controlled movement when transferring from the regulated movement to the controlled movement such that the transfer is performed substantially jerk free.

5. The method as claimed in claim 4, further comprising:
    determining a speed of the rotor on the segment and ascertaining a commutation angle of an electric current in regulated mode;
    regulating the speed of the rotor via a speed control circuit which specifies a target value of a force-forming electric current for a electric current control circuit;
    pre-initializing a specified commutation angle from the force-forming electric current and the ascertained commutation angle; and
    controlling the speed of the rotor by specifying an electric-current indicator, which rotates with a frequency ascertained from the target speed.

6. The method as claimed in claim 5, wherein ascertaining the actual speed occurs aided by a sensor, which is paired with the segment.

7. The method as claimed in claim 6, wherein the sensor has a detection range that extends beyond the segment, wherein ascertainment of at least one (i) position of the rotor and (ii) the ascertainment of the actual speed of the rotor occurs via calculation of an average value.

8. A linear drive comprising:
    at least one segment having a sensor;
    at least one rotor; and
    a control circuit configured to regulate a speed of the at least one rotor on the at least one segment;
    wherein the linear drive is configured to:
        initiate a controlled movement of the at least one rotor on the at least one segment; and
        change from the controlled movement of the at least one rotor on the at least one segment to an unregulated movement on the at least one segment; and
    wherein at least one of (i) a controller is pre-initialized when changing from the controlled movement to a regulated movement such that a transfer is performed substantially jerk free and (ii) a specified commutation angle is pre-initialized for the controlled movement when transferring from the regulated movement to the controlled movement such that the transfer is performed substantially jerk free.

9. The linear drive as claimed in claim 8, further comprising:
    at least one control unit for providing an electric current for the at least one segment;
    wherein the sensor ascertains an actual speed of the at least one rotor;
    wherein the at least one control unit is paired with the at least one segment;
    wherein the sensor is paired with the at least one segment;
    wherein one of (i) another segment and (ii) a conveyor belt is provided to move the rotor on the at least one segment;
    wherein the at least one control unit is configured to provide an electric current for the at least one segment, the electric current moving the at least one rotor in accordance with a target speed which corresponds to the actual speed after the at least one rotor moves onto the at least one segment.

10. The linear drive as claimed in claim 8, wherein the sensor has a detection range which extends beyond the at least one segment.

11. The linear drive as claimed in claim 8, wherein the at least one control unit includes a current converter which provides an electric current for the at least one segment.

12. The linear drive as claimed in claim 8, further comprising:
- a plurality of segments;
- a control unit paired with the plurality of segments;
- at least two segments having a respective sensor; and
- a control device for providing signals to a plurality of control units, the control unit being configured to regulate an actual speed of the at least one rotor based on a target speed of the at least one rotor.

13. The linear drive as claimed in claim 12, wherein the at least one control unit includes a current converter which provides an electric current for the at least one segment.

14. A production machine, machine tool or packing machine, having the linear drive as claimed in claim 8.

\* \* \* \* \*